Patented Aug. 15, 1933

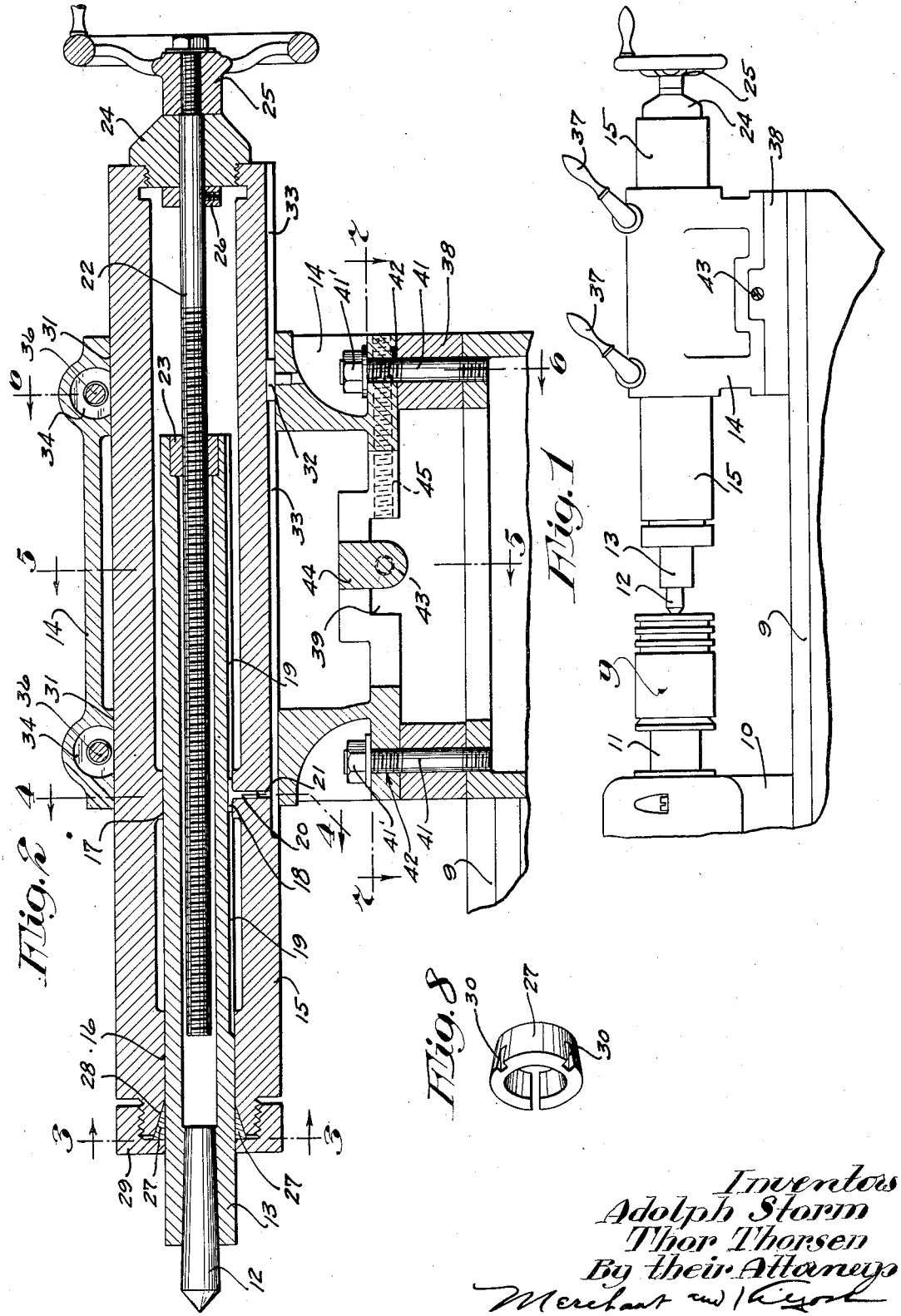

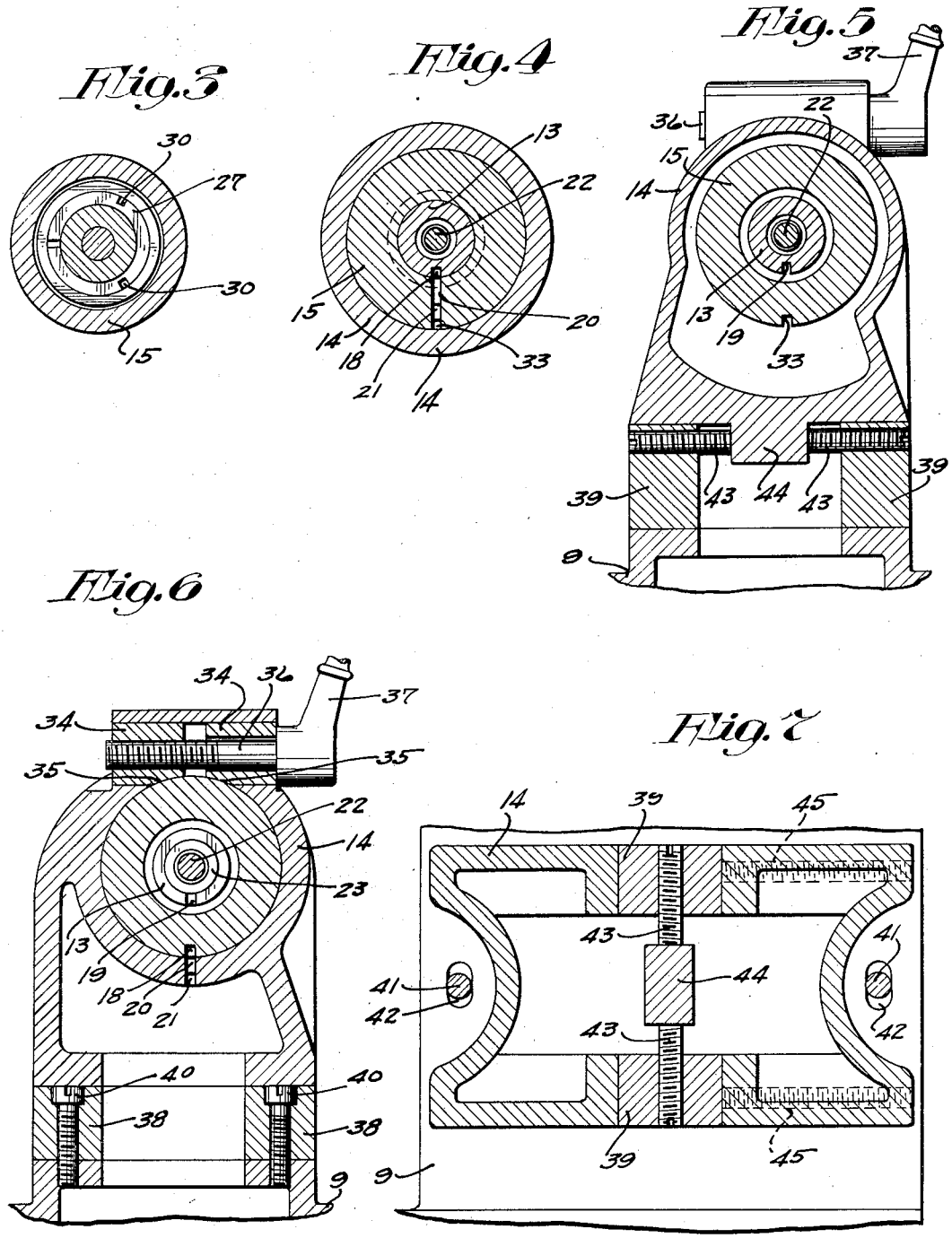

1,922,404

UNITED STATES PATENT OFFICE 1,922,404

TAILSTOCK FOR LATHES, GRINDERS, AND THE LIKE

Adolph Storm and Thor Thorsen, Minneapolis, Minn., assignors to Storm Manufacturing Co., Inc., Minneapolis, Minn., a Corporation of Minnesota Original application March 21, 1930, Serial No. 437,741. Divided and this application February 18, 1931. Serial No. 516,652

1 Claim. (Cl. 82—31)

Our present invention has for its object the provision of a simple and highly efficient dead center and tailstock for lathes, grinders and the like. The invention while intended for general use, is especially designed for use in lathes and grinders for finishing pistons for internal combustion engines where very accurate work is essential.

The invention is a division of our pending United States application for Letters Patent for "piston turning and grinding machine", filed March 21st, 1930, under Serial Number 437,741.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary front elevation showing a piston turning and grinding machine having the invention embodied therein;

Fig. 2 is a view principally in longitudinal central section taken through the tailstock and live center, on an enlarged scale;

Figs. 3 to 6, inclusive, are detail views principally in vertical section taken on the lines 3—3, 4—4, 5—5 and 6—6, respectively, of Fig. 2;

Fig. 7 is a view principally in horizontal section taken on the line 7—7 of Fig. 2; and Fig. 8 is a perspective view of the wedge-acting centering member for the dead center spindle removed from the tailstock extension bar.

Of the parts of the piston turning and grinding machine illustrated and in which the invention is embodied, the numeral 9 indicates the bed, 10 the headstock, 11 the live center, which is the subject matter of a division of the application above identified, and 12 the dead center.

A piston Y is held between the centers 11 and 12 (see Fig. 1).

The dead center 12 is removably mounted in the inner end of a tubular tailstock spindle 13, axially aligned with the live center 11 and held in place by a long tapered fit (see Fig. 2).

To secure true axial movement of the dead center 12 in respect to the live center 11, the support for the spindle 13, to-wit: the tailstock 14, is rigidly secured in respect to the bed 9 and the entire axial adjustment of said dead center is made in respect thereto. On account of the small size of the dead center 12, it is not practical to move the same axially beyond the tailstock 14 to the full capacity of the machine, and for this reason said tailstock is provided with a tubular extension bar 15. This extension bar 15 is of a large diameter and has a pair of axially spaced internal seats 16 and 17 at its inner end portion, in which said spindle is mounted for axial adjustment.

The spindle 13 is held from turning about its longitudinal axis in the seats 16 and 17 by a flat key 18 and a cooperating longitudinal keyway 19 in the spindle 13, in which said key extends. Said key 18 is anchored to the extension bar 15 in respect to the spindle 13 by a round pin 20 formed therewith, intermediate of its ends and turnably mounted in a bore-like radial seat 21 in the extension bar 15. This pin 20 permits the key 18 to lie in the keyway 19 without any binding action thereon.

To axially adjust the spindle 13 in the extension bar 15, there is provided a long feed screw 22 which extends axially into the spindle 13 and extension bar 15 from the outer ends thereof and has threaded engagement with a nut-acting member 23 fixed in said outer end of the spindle 13. The outer end portion of the feed screw 22 is turnably mounted in a bearing 24 secured to the outer end of the extension bar 15 by threaded engagement.

A hand wheel 25, applied to the feed screw 22 outward of the bearing 24, is provided for turning the feed screw 22 in the nut-acting member 23 and thereby impart axial movement to the spindle 13 in the extension bar 15. The feed screw 22 is held against axial movement in the bearing 24 by the hub of the hand wheel 25 and a collar 26, applied to said feed screw within the extension bar 15.

The spindle 13 may be secured to the extension bar 15 in any of its axial adjustments by a lock, comprising a cone-shaped centering wedge 27, mounted in an internal conical seat 28 in the inner end of the spindle 13, and a cooperating knurled hand nut 29. Said centering wedge 27 is transversally divided, encircles the spindle 13 to be contracted thereon by the nut 29, which has external screw threaded engagement with the inner end of the extension bar 15, and impinges against the base of said wedge.

By turning the nut 29 onto the extension bar 15, the centering wedge 27 will be moved axially into its seat 28 and thereby contracted onto the spindle 13 to center and frictionally hold the same where adjusted in the extension bar 15. To facilitate the contraction of the centering wedge 26 onto the spindle 13, the same is weakened at a plurality of circumferentially spaced points by external longitudinal grooves 30 formed therein (see Fig. 8).

The extension bar 15 is mounted in a pair of axially spaced bearings 31 in the tailstock 14, for movement by hand axially toward or from the live center 11 with a free sliding movement. This extension bar 15 is held from turning in the bearings 31 about its longitudinal axis by a key 32 and a cooperating keyway 33, similar to the key 18 and keyway 19. It will be noted that the bearings 31 are continuous and unbroken throughout their entire circumference so that there is no give therein, and hold said bar while the same is being axially adjusted in true axial alignment with the live center 11. The hand wheel 25, in addition to affording means by which the feed screw 22 may be turned, also affords convenient means by which the extension bar 15 may be moved axially.

Two clamps 34, one in each bearing 31, are provided for rigidly securing the extension bar 15 in different axial adjustments in the tailstock 14. Each clamp 34 comprises a pair of axially aligned cylindrical wedges 35 on a rod 36, having on one end a crank-acting handle 37. Said pairs of wedges 35 are mounted in cylindrical seats in the tops of the bearings 31 for endwise sliding movement toward or from each other transversally of the extension bar 15. The wedges 35 of each pair are arranged to impinge against opposite surfaces of the extension bar 15 (see Fig. 6).

The rod 36 has screw threaded engagement with the outer wedge 35, and the inner wedge 35 is loose on said rod and engages the hub of the handle 37 as a base of resistance. A movement of the handles 37 to set the clamps 34 will move the wedges 35 thereof axially toward each other into frictional engagement with the extension bar 15.

Interposed between the bed 9 and tailstock 14 is a tailstock base block 38 to which said tailstock is connected by a pair of aligned tongue and groove guides 39 for straight line sliding movement transversely of the bed 9. The base block 38 is rigidly secured by cap screws 40 to the bed 9. The tailstock 14 is secured to the bed 9 and frictionally clamped onto the base block 38 by a pair of studs 41 anchored to the bed 9, extends through bores in said block and transverse slots 42 in the tailstock 14. Nuts 41' on the studs 41 impinge against the tailstock 14 and frictionally clamp said tailstock onto the base block 38 and said base block onto the bed 9. The purpose of the slots 42 is to permit the required movement of the tailstock 14 in respect to the studs 41 during transverse adjustment of said tailstock on the base block 38 to horizontally align the dead center 12 with the live center 11.

For transversely adjusting the tailstock 14 on the base block 38, there is provided a pair of opposing adjusting screws 43 which have threaded engagement with the members of the guides 39 on the base block 38, and impinge at their inner ends against opposite sides of a depending lug 44 on the bottom of the tailstock 14. The base block 38 may be planed to the proper thickness to vertically align the dead center 12 with the live center 11. A long pair of set screws 45, having threaded engagement with the base of the tailstock 14, impinge against the members of the guides 39 on the base block 38 and hold said tailstock where positioned by the adjusting screws 43.

From the above description it is evident that a slight movement of the handles 37, which are conveniently located, will release the extension bar 15 and permit free axial sliding movement thereof in the bearings 31. By loosening the hand nut 29 and turning the hand wheel 35, the spindle 13 may be axially adjusted in the extension bar 15 for imparting fine axial adjustments to the dead center 12, in respect to the live center 11. This mounting the dead center 12 makes it possible to very quickly and easily axially adjust said dead center, and at the same time is always positively held in true axial alignment with the live center 11.

What we claim is:

In a machine of the class described, a bed, a tailstock base block independent of the bed and rigidly secured thereto, said base block having a pair of upstanding guide lugs endwise spaced transversely thereof in a channel in the tailstock and holding said tailstock for straight line transverse sliding movement, said tailstock having a depending lug between the two guide lugs, said base block having a pair of opposing adjusting screws that impinge against opposite faces of the lug on the tailstock, a pair of nut-equipped screw-studs anchored to the base, extending through holes in the base block and transverse slots in the tailstock and normally holding the tailstock clamped onto the base block, and setscrews in the tailstock that impinge against one of the faces of the guide lugs and hold the tailstock frictionally clamped onto the opposite faces of the guide lugs.

ADOLPH STORM.
THOR THORSEN.